(12) United States Patent
Kono et al.

(10) Patent No.: US 7,918,904 B2
(45) Date of Patent: Apr. 5, 2011

(54) POSITIVE ELECTRODE FOR USE IN LITHIUM CELL AND LITHIUM CELL USING THE SAME

(75) Inventors: Michiyuki Kono, Neyagawa (JP); Eriko Ishiko, Kyoto (JP)

(73) Assignee: Elexcel Corporation Ltd., Kyoto (JP)

( * ) Notice: Subject to any disclaimer, the term of this patent is extended or adjusted under 35 U.S.C. 154(b) by 44 days.

(21) Appl. No.: 12/384,714

(22) Filed: Apr. 8, 2009

(65) Prior Publication Data
US 2009/0220678 A1 Sep. 3, 2009

Related U.S. Application Data

(63) Continuation of application No. 11/267,107, filed on Nov. 3, 2005, now abandoned.

(30) Foreign Application Priority Data

Nov. 8, 2004 (JP) .................................. 2004-324339

(51) Int. Cl.
*H01M 4/58* (2010.01)
*H01M 4/62* (2006.01)
(52) U.S. Cl. ..................... 29/623.5; 429/218.1; 429/221; 429/224; 427/58; 252/182.1
(58) Field of Classification Search .................. 29/623.5; 427/58; 429/218.1, 221, 224
See application file for complete search history.

(56) References Cited

U.S. PATENT DOCUMENTS

| 2004/0043291 A1* | 3/2004 | Kim et al. ...................... 429/217 |
| 2006/0166093 A1* | 7/2006 | Zaghib et al. .................. 429/217 |

FOREIGN PATENT DOCUMENTS

| JP | 08298135 A | * | 11/1996 |
| JP | 2004079276 A | * | 3/2004 |
| WO | WO 2004045007 A2 | * | 5/2004 |

OTHER PUBLICATIONS

IPDL Machine Translation of JP 2004-079276 (Mar. 2004).*
IPDL Machine Translation of JP 2004-079276A (Mar. 2004).*

* cited by examiner

*Primary Examiner* — Gregg Cantelmo
(74) *Attorney, Agent, or Firm* — Jordan and Hamburg LLP (57) ABSTRACT

A positive electrode for use in a lithium battery using water as a dispersion medium, not causing a problem of deteriorating the battery performance due to corrosion of a collector or the like and not forming unevenness on the coating surface, as well as a lithium battery using the positive electrode, the positive electrode used being formed from a positive electrode paste containing a positive electrode active material represented by the following formula (I), a binder ingredient comprising a water dispersible elastomer and a water soluble polymer as a viscosity improver, water as a dispersion medium and a dispersing agent:

$$Li_xMPO_4 \qquad (I)$$

(in the general formula (I) above, M represents a metal atom containing at least one of metal atoms selected from the group consisting of Mn, Fe, Co, Ni, Cu, Mg, Zn, V, Ca, Sr, Ba, Ti, Al, Si, B and Mo, and $0<x<2$).

5 Claims, 6 Drawing Sheets

Fig. 1 (a) Example 1

Fig. 1 (b)

Fig. 1 (c) Comparative Example 2

Fig. 2 (a) Example 1

POSITIVE ELECTRODE FOR USE IN LITHIUM CELL AND LITHIUM CELL USING THE SAME

The present application is a continuation of and claims the benefit of the filing date of U.S. patent application Ser. No. 11/267,107, filed Nov. 3, 2005, now abandoned, and also claims the benefit of the Nov. 8, 2004 filing date of Japanese Patent Application 2004-324339.

BACKGROUND OF THE INVENTION

The present invention concerns a positive electrode for use in lithium cell and a lithium cell using the same.

As electrode materials for lithium secondary cell, it is generally to use carbon compounds such as graphite for a negative electrode and a composite oxide as an electrode active material for a positive electrode. Such positive and negative electrodes are manufactured, for example, by slurryfying an electrode active material, a binder and a electrically conducting agent such as conductive carbon used optionally for improving the electron conductivity with a dispersion medium to prepare a paste or a coating solution, coating the same to an electrode collector by a coater and evaporating the dispersion medium.

An organic dispersion medium such as N-methyl-2-pyrrolidone has been used as the dispersion medium for manufacturing the coating solution but it involves a problem of toxicity in the manufacturing premise, a problem in view of safety, effects of the dispersion medium wastes on environments, a problem of processing cost, etc. In view of the above, it has been demanded to use water which reduces manufacturing cost and does not cause such problems.

In the manufacture of the negative electrode, use of water has been enabled recently as a dispersion medium by using a synthetic rubber latex type adhesive and a viscosity improver, and a manufacturing method capable of avoiding the problems described above has become popular.

On the other hand, in the manufacture of the positive electrode, while $LiCoO_2$ has been widely used generally as the positive electrode active material, when water is used as the dispersion medium upon preparing a positive electrode by a positive electrode paste using $LiCoO_2$ as the positive electrode active material, this results in a problem that LiOH, etc. are formed by reaction of lithium ion in the active material and water to cause corrosion of a collector and deteriorate the cell performance. Accordingly, it is still customary at present to use a styrene butadiene rubber or polyvinylidene fluoride (PVDF) for the binder and a non-aqueous dispersion medium such as N-methyl-2-pyrrolidone for the dispersion medium.

For solving the problem such as corrosion of the collector and enabling the use of water as the dispersion medium, JP-A No. 2000-294252 describes a positive electrode formed by coating the surface of a collector with a protective film of an oxalate salt or a compound of elements selected from silicon, chromium, and phosphorus. Further, JP-A No. 2003-157836 proposes to coat the surface of the positive electrode active material with a protective film having electroconductivity.

However, the positive electrodes described above are not still sufficient in view of the cell performance and since they require a step of covering the collector, etc., they involve a problem that they are disadvantageous also in view of the cost.

On the other hand, the present inventors have noted on lithium phosphate materials such as $LiFePO_4$ as the positive electrode active material. Use of lithium phosphate in the organic dispersion medium system as the positive electrode active material is shown, for example, in JP-T No. 2000-509193, JP-A Nos. 9-134724, 2004-55493, etc.

When the present inventors have attempted to manufacture of a positive electrode by using lithium phosphates such as $LiFePO_4$ in an aqueous system, it has been found that the problem of the corrosion for the collector less occurs. However, it has been found that the positive electrode active material agglomerates upon preparing the paste, tending to cause unevenness on the paste coated surface.

The present invention has been achieved in view of the above and it intends to provide a positive electrode for use in a lithium cell excellent both in electric characteristics and physical properties and a lithium cell using the same, by manufacture from an aqueous coating solution using safe water as a dispersion medium instead of organic dispersion media used so far thereby solving the problem of toxicity in the manufacturing premise, the problem of safety, and the problem of the effects of dispersion medium wastes on environments and the problem of the processing cost, as well as solving the problem of degradation of the cell performance caused by corrosion etc. of collectors and the problem for the occurrence of unevenness on the coated surface.

SUMMARY OF THE INVENTION

In order to solve the foregoing subject, the positive electrode for use in the lithium cell according to the present invention is formed from a positive electrode paste containing a positive electrode active material represented by the following formula (I), a binder ingredient comprising a water dispersible elastomer and a water soluble polymer as a viscosity improver, water as a dispersion medium, and a dispersing agent:

$$Li_xMPO_4 \qquad (I)$$

(in the general formula (I) above, M represents a metal atom containing at least one of metal atoms selected from the group consisting of Mn, Fe, Co, Ni, Cu, Mg, Zn, V, Ca, Sr, Ba, Ti, Al, Si, B and Mo, and $0<x<2$).

The "dispersion medium" used herein is a material for dispersing the constituent ingredients of the positive electrode paste and it includes those dissolving a portion of the constituent ingredients, that is, functioning also as a solvent.

A preferred example of the positive electrode active material includes $LiFePO_4$.

As the dispersing agent, one or more of materials selected from the group consisting of nonionic surfactants, polycarboxylic acid compounds, compounds having sulfonic acid groups, and compounds having vinyl pyrrolidone structure can be used suitably.

The lithium secondary cell according to the invention has a positive electrode of the invention described above, a negative electrode using an active material capable of intercalating/deintercalating metal lithium or lithium ion, and an electrolyte layer.

In the invention, since a lithium phosphate compound such as $LiFePO_4$ is used as the positive electrode active material and a specified positive electrode material composition containing a dispersing agent is adopted, even in a case where water is used as a dispersion medium in the positive electrode preparing step, corrosion of a collector less occurs and the problem of degrading the cell performance can be overcome without covering the collector differently from the prior art, and the problem for the occurrence of unevenness during paste coating can also be overcome. Further, the lithium phosphate compound is an active material capable of solving the problems in view of the resource, cost and safety of existent electrode active materials, being inexpensive and having high safety. Accordingly, a positive electrode for use in a lithium cell having high thermal stability as the cell characteristics and also excellent in the rate characteristic and the cycle characteristic can be provided at a reduce cost.

That is, according to the invention, a lithium cell of high performance can be provided, as well as an effect in view of the manufacture capable of using safe water instead of organic dispersion media having high risk and involving various problems in view of handling can be obtained and it is also advantageous in view of the raw material.

DESCRIPTION OF PREFERRED EMBODIMENTS

1. Positive Electrode

The positive electrode active material used as a positive electrode for use in a lithium secondary cell according to the invention is represented by the following formula (I):

$$Li_xMPO_4 \quad (I)$$

(in the general formula (I) above, M represents metal species containing at least one of metal atoms selected from the group consisting of Mn, Fe, Co, Ni, Cu, Mg, Zn, V, Ca, Sr, Ba, Ti, Al, Si, B and Mo, and $0<x<2$). Among them those containing Fe for M are preferred and $LiFePO_4$ is particularly preferred.

Olivine type $LiFePO_4$ has a theoretical capacitance as high as 170 mAh/g and is inexpensive, and can greatly save the cell manufacturing cost. Further it also has excellent properties as the positive electrode material such as showing scarce toxicity to human bodies or environments, causing less oxygen deintercalation and having high thermal stability.

The starting material for the positive electrode active material includes, for example, Li salts such as LiOH, $Li_2CO_3$, $CH_3COOLi$, and LiCl as the Li source, Fe salts such as $FeC_2O_4$, $(CH_3COO)_2Fe$, $FeCl_2$, and $FeBr_2$ as the Fe source, Mn salts such as $MnCl_2$ as the Mn source, Ni salt such as NiCl as the Ni source, and $Co_3O_4$ as the Co source.

Also in a case where M is other elements, metal salts for each of the elements can be used.

For the P source, $H_3PO_4$, $(NH_4)_2HPO_4$, $NH_4H_2PO_4$, etc. can be used.

The positive electrode active material can be obtained usually by blending the starting materials at an aimed molar ratio and sintering them at a high temperature.

While the grain size of the positive electrode active material is not particularly limited, the average grain size of primary particles is usually about from 10 nm to 100 μm and 30 to 250 nm of grain size is preferred and 60 to 200 nm grain size is more preferred in that the electron conductivity is favorable.

While lithium phosphate compound may be used as it is, a positive electrode active material of low conductivity such as $LiFePO_4$ may be compensated for electron conductivity by coating the surface of particles with carbon. The coating amount of carbon is, preferably, 1 part by weight or more and 20 parts by weight or less and, most preferably, 1 part by weight or more and 10 parts by weight or less based on 100 parts by weight of the positive electrode active material.

Examples of the elastomer usable in the invention include a copolymer of acrylonitrile and butadiene (NBR), a copolymer of acrylonitrile and hydrogenated butadiene (HNBR), a copolymer of styrene ad butadiene (SBR), a copolymer of styrene and acrylonitrile (SAN), a terpolymer of acrylonitrile, butadiene and styrene (ABS), a terpolymer of styrene, acrylonitrile and styrene (SAS), a terpolymer of styrene, isoprene and styrene (SIS), a terpolymer of styrene, butadiene and styrene (SBS), a terpolymer of ethylene, propylene and diene (EPDM), a styrene/ethylene/butene/styrene (SEBS) polymer, a polyurethane elastomer, polychloroprene (CR) or 2-chloro-1,3-butadiene, polyisobutylene (PIB), polyisoprene, polybutadiene, an ethylene/propylene copolymer (EPR), a copolymer of ethylene and vinyl acetate (EVA), a copolymer of ethylene and acrylate ester (EMA, EEA, etc.), a vinyl pyrrolidone/vinyl acetate copolymer, and mixtures thereof. The polymers may have a cross-linked structure.

Among the elastomers described above, the styrene butadiene copolymer (SBR) and an acrylonitrile butadiene copolymer (NBR) are preferred, SBR being particularly preferred.

As the water soluble polymer, one or more members selected from celluloses such as carboxymethyl cellulose (CMC), methyl cellulose, ethyl cellulose, hydroxymethyl cellulose, hydroxypropyl methyl cellulose, and hydroxyethyl methyl cellulose; polycarboxylic acid compounds such as polyacrylic acid, and sodium polyacrylate; compounds having a vinyl pyrrolidone structure such as polyvinyl pyrrolidone; polyacrylamide, polyethylene oxide, polyvinyl alcohol, sodium alginate, xanthane gum, carrageenan, guar gum, agar, and starch can be used, and among them, carboxymethyl cellulose salt is preferred.

In a case where the water soluble polymer is a carboxymethyl cellulose salt, the etherification degree thereof is preferably from 0.3 to 2.0, particularly preferably, from 0.45 to 1 in view of solubility to water, storage stability and manufacturing cost.

In a case of using the dispersible elastomer and the water soluble polymer are used for the positive electrode, the same combination can be applied for the negative electrode to provide an advantage that the same material can be used for both electrodes.

As the water, distilled water, ion-exchanged water, and superpure water are preferred, and the ionic conductivity thereof is preferably 0.5 mS/m or less, more preferably, 0.1 mS/m or less, and organic carbon is, preferably, 100 μg C/L or less, more preferably, 50 μg C/L or less, zinc is, preferably, 0.5 μg Zn/L or less, more preferably, 0.1 μg C/L or less, silica is preferably 50 μg $SiO_2$/L or less, more preferably, 2.5 μg $SiO_2$/L or less, chloride ions are preferably, 10 μg $Cl^-$/L or less, more preferably, 1 μg $Cl^-$/L, and sulfate ions are, preferably 10 μg $SO_4^{2-}$/L or less and, more preferably, 1 μg $SO_4^{2-}$/L or less.

In the invention, use of the dispersing agent can prevent agglomeration of particles and makes the coating of the active material layer smooth upon manufacture of the positive electrode.

Examples of the dispersing agent include nonionic surfactants such as polyoxyethylene tridecylether, polyoxyethylene branched decyl ether, polyoxyethylene isodecyl ether, polyoxyethylene lauryl ether, polyoxyalkylene lauryl ether, polyoxyethylene oleylether, polyoxyethylene alkyl ether, polyoxyethylene styrenated phenyl ether, polyoxyethylene castor oil, polyoxyethylene hardened castor oil, polyoxyethylene oleate ester, polyoxyethylene distearate ester, polyoxyethylene polyoxy propylene block polymer, sorbitan trioleate, sorbitan sesquioleate, sorbitan monooleate, sorbitan monostearate, sorbitan mono coconut fatty acid ester, polyoxyethylene sorbitan mono coconut fatty acid ester, polyoxyethylene sorbitan monostearate, polyoxyethylene sorbitan monostearate, polyoxyethylene sorbitan monooleate, polyoxyethylene lanolin alcohol ether, polyoxyethylene lanoline fatty acid ester, polyoxyethylene alkyl amine ether, coconut fatty acid diethanolamide, acetylene glycol, acetylene alcohol, acetylene glycol alkylene oxide adduct, acetylene alcohol alkylene oxide adduct; compounds having a sulfonic acid group such as aromatic sulfonic acid formalin condensation products such as sodium β-naphthalene sulfate formalin condensation products, special sodium aromatic sulfate formalin condensation products, sodium alkyl naphthalene sulfonate formalin condensation products, and sodium polystyrene sulfonate, and sodium lignine sulfonate; polycarboxylic acid compounds such as ammonium polycarboxylate salts, sodium polycarboxylate salts, polyoxyethylene alkyl ether sulfate salts, polyacrylic acid, and sodium polyacrylate; compounds having a vinyl pyrrolidone structure such as polyvinyl pyrolidone and a copolymer of vinyl pyrrolidone and acrylic acid; and anionic surfactants such as polyoxyethylene alkyl ether, and among them, the nonionic surfactants, polycarboxylic acid compounds, compounds having a sulfonic acid group and compounds having a vinyl pyrrolidone structure are particularly preferred. One or more dispersing agents may be used in combination.

The blending ratio of the positive electrode active material, water dispersible elastomer, water soluble polymer, dispersing agent and water, as a ratio based on 100 parts by weight of the positive electrode active material (as solids) is as follows. The elastomer is, preferably, 0.5 part by weight or more and 12 parts by weight or less, more preferably, 1 part by weight or more and 6 parts by weight or less. The water soluble polymer, is preferably, 0.1 part by weight or more and 12 parts by weight or less, more preferably, 0.5 part by weight or more and 4 parts by weight or less. The dispersing agent is, preferably, 0.05 part by weight or more and 10 parts by weight or less, more preferably, 0.2 part by weight or more and 5 parts by weight or less. Water is, preferably, 20% by weight or more and 95% by weight or less, more preferably, 40 parts by weight or more and 70% by weight or less in the paste.

In order to enhance the dispersing effect, an organic dispersion medium such as N-methyl-2-pyrrolidone, acetonitrile, methanol, ethanol, and isopropyl alcohol may be incorporated at the ratio of 20% by weight or less in the dispersion medium component within a range not departing the purpose object of the invention.

As an ingredient other than those described above, an electrically conducting agent may be added in order to enhance electroconductivity, and one or more carbonaceous materials such as carbon black, acetylene black and graphite which has been used so far for the positive electrode can be used.

The positive electrode of the invention is manufactured by preparing a paste-like positive electrode material by mixing each of the ingredients described above, coating the same to an aluminum foil or the like to be a collector and evaporating the dispersion medium. It is preferred that the elastomer is prepared into an emulsion, and the water soluble polymer is previously prepared into an aqueous solution of about from 0.5 to 10%.

The method, the order, and the like of mixing each of the ingredients described above are not particularly limited, and for example, the active material and the electrically conducting agent can be used while being mixed previously. For the mixing in this case, a mortar, a mill mixer, a ball mill such as a planetary ball mill or a shaker type ball mill, mechanofusion or the like can be used. Also the method for the addition of the dispersing agent is also not particularly restricted, and it can be used as an aqueous solution at a concentration of 0.5% by weight or more or can be used as it is. In addition, the electrically conducting agent can be used in a state of a liquid electrifying dispersion in which the electrically conducting agent is previously dispersed in an aqueous solution of the dispersing agent.

2. Lithium Secondary Battery

The lithium secondary battery of the invention is composed of the positive electrode, the negative electrode and the electrolyte layer for the lithium secondary battery of the invention.

The negative electrode is preferably capable of intercalating/deintercalating metallic lithium or lithium ions, and the material constitution is not particularly limited but known materials can be used.

As a specific example, a negative electrode prepared by coating a material obtained by mixing a negative electrode active material and a binder to a collector can be used.

As the negative active material, known active materials can be used with no particular restriction. For example, carbon materials such as natural graphite, artificial graphite, less graphitizing carbon, easily graphitizing carbon, metal materials such as metallic or alloyed lithium, or tin compounds, lithium transition metal nitrides, crystalline metal oxides, amorphous metal oxides and electroconductive polymers can be used.

As the binder, organic or inorganic binders can be used, and for example, all of aqueous dispersible elastomers mentioned as those usable for the positive electrode such as polyvinylidene fluoride and styrene butadiene copolymers, and water soluble polymers as a viscosity improver can be used.

As a collector for the negative electrode, for example, copper, nickel and the like fabricated in the form of a mesh, punched metal, expanded metal or a planar shaped foil can be used.

The electrolyte layer is a layer put between the positive electrode and the negative electrode, which is a layer containing an electrolyte solution or a polymer having an electrolyte salt dissolved therein or a polymeric gel electrolyte. In a case of using the electrolyte solution or the polymeric gel electrolyte, it is preferred to use a separator in combination.

The electrolyte may be an electrolyte which is used in ordinary lithium secondary batteries, and comprises an electrolyte salt and a non-aqueous medium.

The electrolytic salt includes, for example, $LiPF_6$, $LiBF_4$, $LiClO_4$, $LiAsF_6$, $LiCl$, $LiBr$, $LiCF_3SO_3$, $LiN(CF_3SO_2)_2$, $LiC(CF_3SO_2)_3$, $LiI$, $LiAlCl_4$, $NaClO_4$, $NaBF_4$, $NaI$, and the like, and particularly includes inorganic lithium salts such as $LiPF_6$, $LiBF_4$, $LiClO_4$, $LiAsF_6$, and organic lithium salts represented by $LiN(SO_2C_xF_{2x+1})(SO_2C_yF_{2y+1})$, in which x and y each represents 0 or an integer of from 1 to 4, and x+y is from 2 to 8.

The organic lithium salt includes, specifically, $LiN(SO_2F)_2$, $LiN(SO_2CF_3)(SO_2C_2F_5)$, $LiN(SO_2CF_3)(SO_2C_3F_7)$, $LiN(SO_2CF_3)(SO_2C_4F_9)$, $LiN(SO_2C_2F_5)_2$, $LiN(SO_2C_2F_5)(SO_2C_3F_7)$, $LiN(SO_2C_2F_5)(SO_2C_4F_9)$, etc.

Among them, $LiPF_6$, $LiBF_4$, $LiN(CF_3SO_2)_2$, $LiN(SO_2F)_2$, $LiN(SO_2C_2F_5)_2$, etc., are preferably used as the electrolyte since they are excellent in electric characteristics.

One or more kinds of electrolyte salts may be used.

The organic solvent in which the electrolyte salt is dissolved is not particularly restricted so long as it is an organic solvent to be used for a non-aqueous electrolyte solution of ordinary lithium secondary batteries, and includes, for example, carbonate compounds, lactone compounds, ether compounds, sulfolane compounds, dioxolane compounds, ketone compounds, nitrile compounds and halogenated hydrocarbon compounds. They specifically include carbonates such as dimethyl carbonate, methyl ethyl carbonate, diethylcarbonate, ethylene carbonate, propylene carbonate, ethylene glycol dimethylcarbonate, propylene glycol dimethyl carbonate, ethylene glycol diethyl carbonate, and vinylene carbonate, lactones such as γ-butyrolactone, ethers such as dimethoxyethane, tetrahydrofuran, 2-methyltetrahydrofuran, tetrahydropyran, and 1,4-dioxane, sulfolans such as sulfolane and 3-methyl sulfolane, dioxolanes such as 1,3-dioxolane, ketones such as 4-methyl-2-pentanone, nitriles such as acetonitrile, propionitrile, valeronitrile, benzonitrile, halogenated hydrocarbons such as 1,2-dichloroethane, and other ionic liquids such as methyl formate, dimethyl formamide, diethyl formamide, dimethyl sulfoxide, imidazolium salts, and quaternary ammonium. Further mixtures thereof may also be used.

Among the organic solvents described above, it is particularly preferred that one or more kinds of non-aqueous media selected from carbonates are contained since they provide excellent solubility, dielectric constant and viscosity of the electrolyte.

The polymeric compounds to be used for the polymeric electrolyte or the polymeric gel electrolyte include, for example, polymers such as of ether, ester, siloxane, acrylonitrile, vinylidene fluoride, hexafluoropropylene, acrylate, methacrylate, styrene, vinyl acetate, vinyl chloride, and oxetane or polymeric materials having a copolymer structure thereof or a cross-linked product thereof, and one or more polymeric materials may be used. The polymeric structure is not particularly restricted, and, polymeric materials having an ether structure such as polyethylene oxide are particularly preferred.

The electrolyte is contained in a battery container, as a liquid electrolyte in liquid-type batteries, as a precursor solution having a polymer dissolved in the liquid electrolyte in gel-type batteries, and as a polymer before cross-linking having an electrolyte salt dissolved therein in solid electrolyte-type batteries.

Also for the separator, separators used for ordinary lithium secondary batteries can be used with no particular restriction, and for example, porous resins and non-woven fabrics made, for example, of polyethylene, polypropylene, polyolefin or polytetrafluoroethylene can be used.

Examples of the invention will be described below, but the invention is not limited to the following examples.

Example 1

100 g of $LiFePO_4$ with 5% by weight of a carbon coating amount as a positive electrode active material, 10 g of acetylene black (manufactured by Denki Kagaku Kogyo Co.) as an electrically conducting agent, 120 g of an aqueous 2 wt % solution of carboxymethyl cellulose with an etherfying degree of from 0.45 to 0.55 (CELOGEN PL-15, manufactured by Daiichi Kogyo Seiyaku Co.) as a viscosity improver, and 0.5 g of a nonionic surfactant having a polyoxyethylene styrenated phenyl ether structure (trade name of products: NOIGEN EA-137, manufactured by Daiichi Kogyo Seiyaku Co.) as a dispersing agent were mixed by a homo-mixer for 30 min. 10 g of an aqueous 40 wt % solution of the SBR emulsion (trade name of products: MB-400B, manufactured by Nippon Zeon Co.) as a binder and 50 g of water as a dispersion medium were added to the mixed solution, stirred by a homo-mixer for 15 min and, further, mixed by a ball mill for 6 hours, to prepare a positive electrode paste.

The positive electrode paste was coated to an aluminum foil as a collector by an applicator and dried at 100° C. to obtain a positive electrode.

For the thus prepared positive electrode, it was visually observed whether agglomerates of 0.5 mm diameter or more were present or not in the active material layer.

Further, a charge/discharge test was conducted by using the obtained positive electrode in a 2-electrode type beaker cell. Metallic lithium was used for the negative electrode, and an $LiPF_6$ solution (1 mol/L) with a solvent of ethylene carbonate (EC)/γ-butyrolactone (GBL)/ethyl methyl carbonate (EMC)=3/2/5 (by volume ratio) is used as an electrolyte.

The test cell was charged/discharge for one cycle at 0.25 mAh/g, and the discharge capacitance was defined as an effective capacitance. In the cycle test, the effective capacitance was defined as 1 C for identical cell. Using the same cell, a test was conducted for 200 cycles under the condition for charge discharge at 1 C, and the retention ratio of the discharge capacitance at 200 cycle was determined based on the discharge capacitance at the initial 1 C discharge in the cycle test as the standard capacitance. The voltage was 4.0 V to 2.0 V and the temperature was at 20° C.

Table 1 shows the result of observation for the active material layer, the effective capacitance, and the capacitance retention ratio after 200 cycles.

Example 2

100 g of $LiFePO_4$ with 2% by weight of a carbon coating amount as a positive electrode active material, 6 g of acetylene black (manufactured by Denki Kagaku Kogyo Co.) as an electrically conducting agent, 100 g of an aqueous 2 wt % solution of carboxymethyl cellulose with etherfying degree from 0.6 to 0.7 (CELOGEN WS-C, trade name of products, manufactured by Daiichi Kogyo Seiyaku Co.) and 1 g of a nonionic surfactant of a polyoxyethylene styrenated phenyl ether structure as a dispersing agent (NOIGEN EA-187, trade name of products manufactured by Daiichi Kogyo Seiyaku Co.) were mixed by a homo-mixer for 30 min. 5 g of a 40 wt % solution of an SBR emulsion (BM-400B, trade name of products manufactured by Nippon Zeon Co.) as a binder, and 50 g of water as a dispersion medium were added to the mixed solution, stirred by a homo-mixer for 15 min and, further mixed by a ball mill for 6 hours, to obtain a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode.

Example 3

100 g of LiCoPO$_4$ with 5% by weight of a carbon coating amount as a positive electrode active material, 3 g of carbon black (trade name of products: Ketchen Black EC, manufactured by AKZO NOBEL Co.) as an electrically conducting agent, 100 g of an aqueous 1 wt % solution of carboxymethyl cellulose with an etherfying degree of from 0.55 to 0.65 (CELOGEN 3H, manufactured by Daiichi Kogyo Seiyaku Co.) as a viscosity improver, and 2 g of a sodium naphthalene sulfonate formalin condensation product (trade name of products: Lavelin FM-P, Daiichi Kogyo Seiyaku Co.) as a dispersing agent were mixed by a homo-mixer for 30 min. 7.5 g of an aqueous 40 wt % solution of an SBR emulsion (trade name of products: BM-400B, manufactured by Nippon Zeon Co.) as a binder and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and an LiBF$_4$ solution (2 mol/L) with a solvent of ethylene carbonate (EC)/γ-butyrolactone (GBL)=3/7 (volume ratio) as an electrolyte.

Example 4

100 g of LiFePO$_4$ with 3% by weight of a carbon coating amount as a positive electrode active material, 3 g of carbon black (trade name of products: Ketchen Black EC, manufactured by AKZO NOBEL Co.) as an electrically conducting agent, 90 g of an aqueous 1 wt % solution of carboxymethyl cellulose with an etherfying degree of from 1.15 to 1.45 (CELOGEN HE-1500F, manufactured by Daiichi Kogyo Seiyaku Co.) as a viscosity improver, and 0.4 g of polycarboxylic acid (trade name of products: POLITY 335S, manufactured by Lion Corp.) as a dispersing agent were mixed by a homo-mixer for 30 min. 7.5 g of an aqueous 40 wt % solution of an acrylonitrile butadiene emulsion (trade name of products: BM-400B, manufactured by Nippon Zeon Co.) as a binder and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiN(CF$_3$SO$_2$)$_2$ (0.5 mol/L) and LiN(SO$_2$F)$_2$(1 mol/L) with a solvent of ethylene carbonate (EC)/γ-butyrolacton (GBL)/propylene carbonate (PC)=2/2/6 (volume ratio) as an electrolyte.

Example 5

100 g of LiFePO$_4$ as a positive electrode active material, 10 g of acetylene black (manufactured by Denki Kagaku Kogyo Co.) as an electrically conducting agent, 100 g of an aqueous 2 wt % solution of hydroxypropyl methylcellulose as a viscosity improver, and 1 g of a non-ionic surfactant of a polyoxyethylene styrenated phenylether structure (trade name of products: NOIGEN EA-187 manufactured by Daiichi Kogyo Seiyaku Co.) as a dispersing agent were mixed by a homo-mixer for 30 min. 10 g of an aqueous 40 wt % solution of an SBR emulsion (trade name of products: BM-400B, manufactured by Nippon Zeon Co.) as a binder and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiPF$_4$ (1 mol/L) with a solvent of ethylene carbonate (EC)/γ-butyrolactone (GBL)/ethylmethyl carbonate (EMC)=3/3/4 (volume ratio) as an electrolyte.

Example 6

100 g of LiFe$_{0.25}$Ti$_{0.75}$PO$_4$ with 5% by weight of a carbon coating amount as a positive electrode active material, 6 g of acetylene black (manufactured by Denki Kagaku Kogyo Co.) as an electrically conducting agent, 70 g of an aqueous 0.5 wt % solution of carboxymethyl cellulose with an etherfying degree of from 0.65 to 0.75 (CELOGEN BSH-12, manufactured by Daiichi Kogyo Seiyaku Co.) as a viscosity improver, and 0.8 g of an anionic surfactant (trade name of products: Hitenol NE-05, manufactured by Daiichi Kogyo Seiyaku Co.) as a dispersing agent were mixed by a homo-mixer for 30 min. 8 g of an aqueous 40 wt % solution of an SBR emulsion (trade name of products: BM-400B, manufactured by Nippon Zeon Co.) as a binder and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiBF$_4$ (1.5 mol/L) with a solvent of ethylene carbonate (EC)/γ-butyrolacton (GBL)/dimethyl carbonate (DMC)=3/6/1 (volume ratio) as an electrolyte.

Example 7

100 g of LiFePO$_4$ with 2% by weight of a carbon coating amount as a positive electrode active material, 6 g of acetylene black (manufactured by Denki Kagaku Kogyo Co.) as an electrically conducting agent, 100 g of an aqueous 2 wt % solution of carboxymethyl cellulose with an etherfying degree of from 0.6 to 0.7 (CELOGEN WS-C, manufactured by Daiichi Kogyo Seiyaku Co.) as a viscosity improver, and 3 g of an aqueous 10% solution of polyvinyl pyrrolidone (trade name of products: PITZCOL K-30, manufactured by Daiichi Kogyo Seiyaku Co.) as a dispersing agent were mixed by a homo-mixer for 30 min. 10 g of an aqueous 40 wt % solution of an SBR emulsion (trade name of products: BM-400B, manufactured by Nippon Zeon Co.) as a binder and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiN(CF$_3$SO$_2$)$_2$ (1 mol/L) with a solvent of ethylene carbonate (EC)/γ-butyrolacton (GBL)/diethyl carbonate (DEC)=4/3/3 (volume ratio) as an electrolyte.

Example 8

100 g of $LiFe_{0.5}Mn_{0.5}PO_4$ with 2% by weight of a carbon coating amount as a positive electrode active material, 6 g of acetylene black (manufactured by Denki Kagaku Kogyo Co.) as an electrically conducting agent, 100 g of an aqueous 2 wt % solution of carboxymethyl cellulose with an etherfying degree of from 0.6 to 0.7 (CELOGEN WS-C, manufactured by Daiichi Kogyo Seiyaku Co.) as a viscosity improver, and 1 g of a nonionic surfactant having a polyoxyethylene styrenated phenol ether structure (trade name of products: NOIGEN EA-187, manufactured by Daiichi Kogyo Seiyaku Co.) as a dispersing agent were mixed by a homo-mixer for 30 min. 3 g of an aqueous 40% solution of an SBR emulsion (trade name of products: BM-400B, manufactured by Nippon Zeon Co.) as a binder, 2 g of a 40 wt % solution of an acrylic emulsion, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of $LiPF_6$ (1 mol/L) with a solvent of ethylene carbonate (EC)/γ-butyrolacton (GBL)/ethyl methyl carbonate (EMC)=3/5/2 (volume ratio) as an electrolyte.

Example 9

100 g of $LiFePO_4$ with 2% by weight of a carbon coating amount as a positive electrode active material, 6 g of acetylene black (manufactured by Denki Kagaku Kogyo Co.) as an electrically conducting agent, 100 g of an aqueous 2 wt % solution of methyl cellulose (trade name of products: SM-400, manufactured by Shin-etsu Chemical Co.) as a viscosity improver, and 0.5 g of a nonionic surfactant (trade name of products: NOIGEN EA-187, manufactured by Daiichi Kogyo Seiyaku Co.) as a dispersing agent were mixed by a homo-mixer for 30 min. 5 g of an aqueous 40% solution of SBR emulsion (trade name of products: BM-400B, manufactured by Nippon Zeon Co.) as a binder, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

A gel electrolyte was used for the electrolyte layer. For the preparation of the gel electrolyte, tri-functional polyether acrylate (trade name of products: ELEXEL TA-140) manufactured by Daiichi Kogyo Seiyaku Co.) as a polymer ingredient and a solution of $LiBF_4$ (2 mol/L) with a solvent of ethylene carbonate (EC)/γ-butyrolactone (GBL)/ethylmethyl carbonate (EMC)=3/6/1 (volume ratio) as an electrolyte solution were used at 5:95 (weight ratio). Further, 2000 ppm of an organic peroxide (trade name of products: PARKDOX 16 manufactured by Kayaku Akuzo Corp.) was added as a heat polymerization initiator to obtain a precursor solution. The precursor solution was poured into a beaker cell in which the positive electrode and the negative electrode were previously prepared, to conduct heat polymerization at 80° C. for 1 hour to obtain an electrolyte.

Evaluation was conducted in the same manner as in Example 1 except for using the obtained positive electrode and the gel electrolyte.

Example 10

100 g of $LiFePO_4$ with 2% by weight of a carbon coating amount as a positive electrode active material, 6 g of acetylene black (manufactured by Denki Kagaku Kogyo Co.) as an electrically conducting agent, 100 g of an aqueous 2 wt % solution of carboxyl methyl cellulose with an etherifying degree of from 0.6 to 0.7 (trade name of products: CELOGEN WS-C, manufactured by Daiichi Kogyo Seiyaku Co.) as a viscosity improver, and 0.2 g of a nonionic surfactant having a polyoxyethylene styrenated phenol ether structure (trade name of products: NOIGEN EA-187, manufactured by Daiichi Kogyo Seiyaku Co.) as a dispersing agent were mixed by a homo-mixer for 30 min. 5 g of an aqueous 40% solution of an SBR emulsion (trade name of products: BM-400B, manufactured by Nippon Zeon Co.) as a binder, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

100 g of graphite as a negative electrode active material, 2 g of acetylene black as an electrically conducting agent, 100 g of an aqueous 2 wt % solution of carboxymethyl cellulose (CELOGEN WS-C, trade name of products, manufactured by Daiichi Kogyo Seiyaku Co.) as a viscosity improver were mixed by a homo-mixer for 30 min. 5 g of a 40 wt % solution of an SBR emulsion (BM-400B, trade name of products manufactured by Nippon Zeon Co.) as a binder, and 50 g of water as a dispersion medium were added to the mixed solution, stirred by a homo-mixer for 15 min and, further mixed by a ball mill for 16 hours, to obtain a negative electrode paste.

The negative electrode paste was coated on a copper foil as a collector by an applicator and dried at 100° C. to obtain a negative electrode.

Tests were conducted in the same manner as in Example 1 except for using the thus obtained positive electrode, and the negative electrode, and a solution of $LiBF_4$ (1.5 mol/L) with a solvent of ethylene carbonate (EC)/γ-butyrolacton (GBL)/ethyl methyl carbonate (EMC)=5/4/1 (volume ratio) as an electrolyte.

Example 11

100 g of $LiFe_{0.25}Mo_{0.75}PO_4$ with 3% by weight of a carbon coating amount as a positive electrode active material, 10 g of acetylene black (manufactured by Denki Kagaku Kogyo Co.) as an electrically conducting agent, 100 g of an aqueous 2 wt % solution of hydroxypropyl methyl cellulose as a viscosity improver, and 1 g of a nonionic surfactant having a polyoxyethylene styrenated phenyl ether structure (trade name of products: NOIGEN EA-187, manufactured by Daiichi Kogyo Seiyaku Co.) as a dispersing agent were mixed by a homo-mixer for 30 min. 10 g of an aqueous 40% solution of an SBR emulsion (trade name of products: BM-400B, manufactured by Nippon Zeon Co.) as a binder, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiBF$_4$ (1 mol/L) with a solvent of ethylene carbonate (EC)/γ-butyrolactone (GBL)/ethyl methyl carbonate (EMC)=3/5/2 (volume ratio) as an electrolyte.

Example 12

100 g of LiFe$_{0.3}$Al$_{0.7}$PO$_4$ with 2% by weight of a carbon coating amount as a positive electrode active material, 10 g of acetylene black (manufactured by Denki Kagaku Kogyo Co.) as an electrically conducting agent, 70 g of an aqueous 1 wt % solution of hydroxyethyl methyl cellulose as a viscosity improver, and 1 g of a nonionic surfactant having a polyoxyethylene styrenated phenyl ether structure (trade name of products: NOIGEN EA-187, manufactured by Daiichi Kogyo Seiyaku Co.) as a dispersing agent were mixed by a homo-mixer for 30 min. 8 g of an aqueous 40% solution of an SBR emulsion (trade name of products: BM-400B, manufactured by Nippon Zeon Co.) and 2 g of a 40 wt % vinyl acetate emulsion as a binder, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiBF$_4$ (1.5 mol/L) with a solvent of ethylene carbonate (EC)/γ-butyrolactone (GBL)/ethyl methyl carbonate (EMC)=3/6/1 (volume ratio) as an electrolyte.

Example 13

100 g of LiFePO$_4$ with 5% by weight of a carbon coating amount as a positive electrode active material, 10 g of acetylene black (trade name of products: Denka Black, manufactured by Denki Kagaku Kogyo Co.) as an electrically conducting agent, 100 g of an aqueous 2 wt % solution of carboxymethyl cellulose with an etherifying degree of from 0.6 to 0.7 (CELOGEN WS-C, manufactured by Daiichi Kogyo Seiyaku Co.) as a viscosity improver, and 1 g of a nonionic surfactant having a polyoxyethylene styrenated phenyl ether structure (trade name of products: NOIGEN EA-187, manufactured by Daiichi Kogyo Seiyaku Co.) as a dispersing agent were mixed by a homo-mixer for 30 min. 6.7 g of an aqueous 45% solution of a nonionic urethane elastomer (trade name of products: Superflex 500, manufactured by Diichi Kogyo Seiyaku Co.) as a binder, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode, and a solution of LiPF$_6$ (1 mol/L) with a solvent of ethylene carbonate (EC)/propylene carbonate (PC)/ethyl methyl carbonate (EMC)=2/1/7 (volume ratio) as an electrolyte.

Example 14

100 g of LiFe$_{0.5}$Mn$_{0.5}$PO$_4$ with 5% by weight of a carbon coating amount as a positive electrode active material, 10 g of acetylene black (manufactured by Denki Kagaku Kogyo Co.) as an electrically conducting agent, 120 g of an aqueous 2 wt % solution of carboxymethyl cellulose with an etherifying degree of from 0.45 to 0.55 (CELOGEN PL-15, manufactured by Daiichi Kogyo Seiyaku Co.) as a viscosity improver, and 0.5 g of an acetylene alcoholic nonionic surfactant (trade name of products: Olfin B, manufactured by Nisshin Kagaku Kogyo Co.) as a dispersing agent were mixed by a homo-mixer for 30 min. 9.4 g of an aqueous 32% solution of an anionic urethane elastomer (trade name of products: Superflex 420, manufactured by Diichi Kogyo Seiyaku Co.) as a binder, and 50 g of water as a dispersion medium were added to the mixed solution, stirred by a homo-mixer for 15 min and, further, mixed by a ball mill for 6 hours, to prepare a positive electrode paste.

The positive electrode paste was coated on an aluminum foil as a collector by an applicator and dried at 100° C. to obtain a positive electrode.

Evaluation was conducted in the same manner as in Example 1 except for using the thus obtained positive electrode.

Comparative Example 1

100 g of LiFePO$_4$ with 5% by weight of a carbon coating amount as a positive electrode active material, 10 g of acetylene black (manufactured by Denki Kagaku Kogyo Co.) as an electrically conducting agent, 117 g of an aqueous 12 wt % solution of PVDF in N-methyl-2-pyrrolidone (trade name of products: #1120, manufactured by Kureha Kagaku Co.), and 50 g of N-methyl-2-pyrrolidone as a dispersing agent were added to the mixed solution, stirred by a homo-mixer for 1 hour, to prepare a positive electrode paste.

The positive electrode paste was coated on an aluminum foil as a collector by an applicator and dried at 140° C. to obtain a positive electrode.

A beaker cell was prepared by using the thus obtained positive electrode, the negative electrode and an electrolyte similar to those in Example 1, and a charge/discharge test was conducted.

Comparative Example 2

100 g of LiCoO$_2$ (trade name of products: Cellseed C5, manufactured by Nippon Kagaku Kogyo Co.) as a positive electrode active material, 6 g of acetylene black (manufactured by Denki Kagaku Kogyo Co.) as an electrically conducting agent, 120 g of an aqueous 2 wt % solution of an carboxymethyl cellulose (trade name of products: PL-15 manufactured by Daiichi Kogyo Seiyaku Co.) were mixed by a homo-mixer for 30 min. 5 g of an aqueous 40 wt % solution of SBR emulsion (trade name of products: BM-400B, manufactured by Nippon Zeon Co.) as a binder and 50 g of water as a dispersion medium were added to the mixed liquid, stirred by a homo-mixer for 15 min, and further mixed by a ball mill for 6 hours to obtain a positive electrode.

The positive electrode paste was coated on an aluminum foil as a collector by an applicator and dried at 100° C. to obtain a positive electrode.

A beaker cell was prepared by using the thus obtained positive electrode and the negative electrode and an electrolyte similar to those in Example 1, and a charge/discharge test was conducted. The test was conducted within a range of the voltage from 4.2 V to 2.8 V.

For the beaker cells under the conditions in Example 1 and Comparative Examples 1, 2, a rate characteristic test at 0.2 C, 1 C, 3 C, and 5 C, and a cycle characteristic test at 1 C charge/discharge were conducted. The results are shown in FIGS. 1(a)-1(c) and FIGS. 2(a)-2(c).

Figure 1:
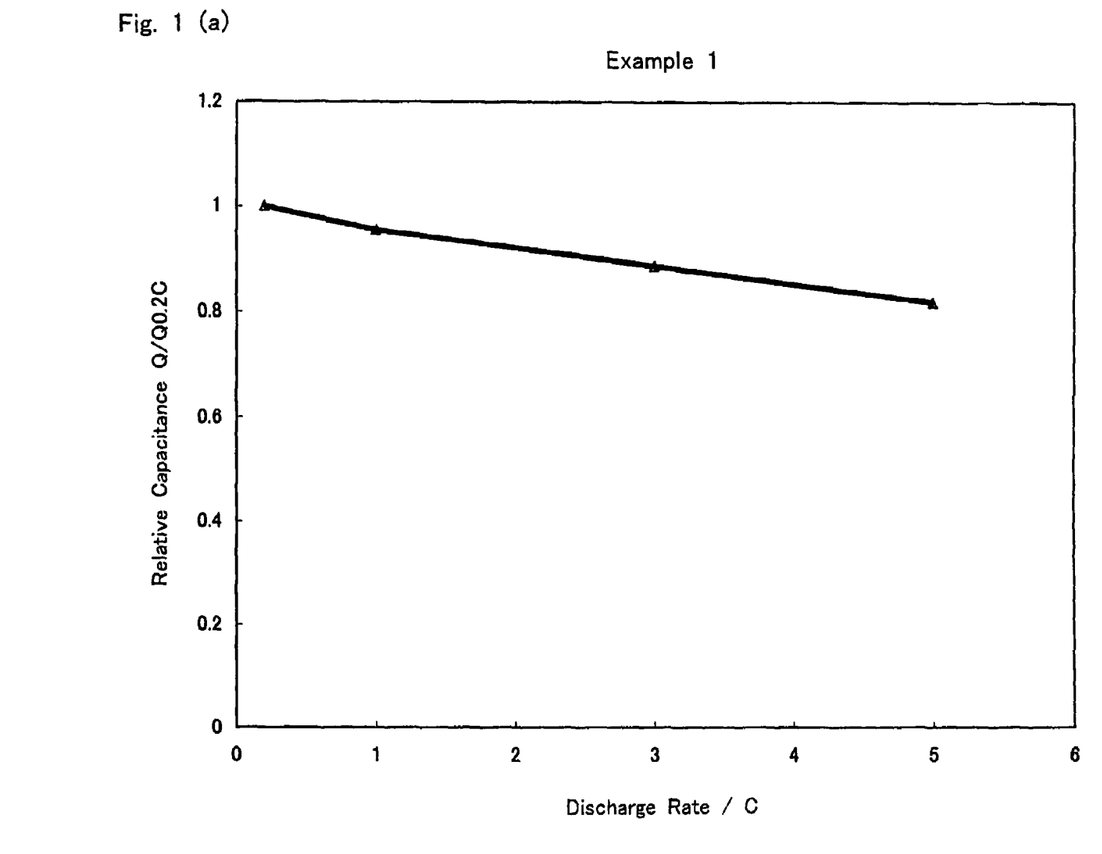
FIG. 1(a) is a graph showing the result of a rate characteristic test at 10.2 C, 1 C, 3 C, and 5 C for beaker cells of Example 1.
FIG. 1(b) is a graph showing the result of a rate characteristic test at 0.2 C, 1 C, 3 C, and 5 C for beaker cells of Comparative Example 1.
FIG. 1(c) is a graph showing the result of a rate characteristic test at 0.2 C, 1 C, 3 C, and 5 C for beaker cells of Comparative Example 2.
Figure 2:
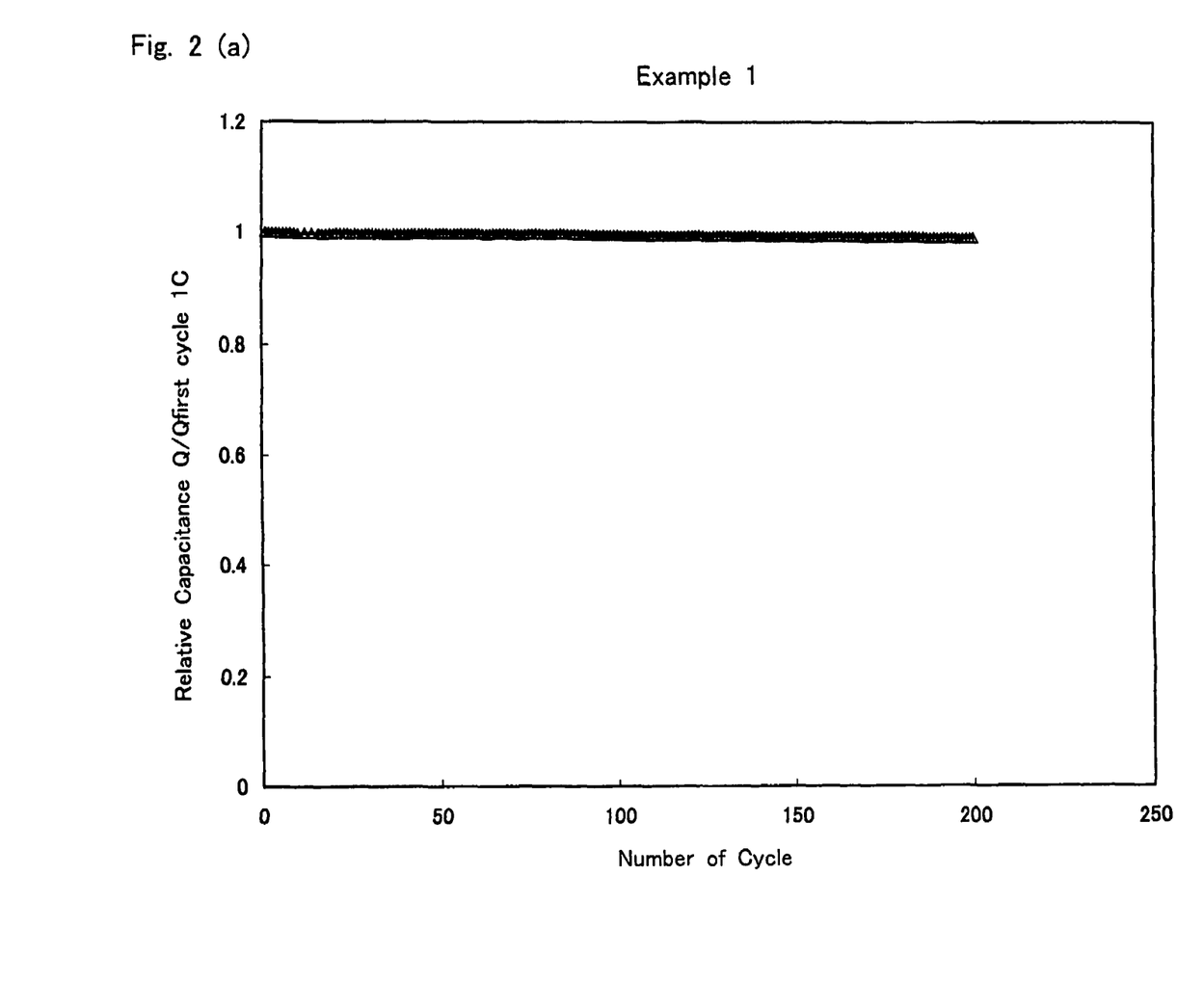
FIG. 2(a) is a graph showing the result of a cycle characteristic test at 1 C charge/discharge for beaker cells of Example 1.
FIG. 2(b) is a graph showing the result of a cycle characteristic test at 1 C charge/discharge for beaker cells of Comparative Example 1.
FIG. 2(c) is a graph showing the result of a cycle characteristic test at 1 C charge/discharge for beaker cells of Comparative Example 2.

As can be seen from FIGS. 1(a)-1(c), for the battery using the positive electrode of the invention, a battery excellent in the bonding property with the collector by using a smaller amount of binder than the positive electrode using PVDF of Comparative Example 1 was obtained, and it was excellent in the characteristic at high rate (5 C). Further, since the rate after 2 C was lowered abruptly in Comparative Example 2, it can be seen that preparation of a paste by using $LiCoO_2$ and using water as the dispersion medium is not preferred. Further, also in the cycle characteristic test, like in the rate characteristic, the cells of Comparative Examples 1, 2 caused lowering of capacitance not reaching the 200 cycles.

TABLE 1

| No. | Presence or absence of agglomerate particle | Effective capacitance (mAh/g) | Capacitance retention ratio at 200 cycle (%) |
|---|---|---|---|
| Example 1 | none | 160 | 99.6 |
| Example 2 | none | 158 | 99.7 |
| Example 3 | none | 134 | 97.5 |
| Example 4 | none | 138 | 98.0 |
| Example 5 | none | 138 | 98.9 |
| Example 6 | none | 140 | 97.6 |
| Example 7 | none | 144 | 99.5 |
| Example 8 | none | 135 | 99.3 |
| Example 9 | none | 145 | 99.7 |
| Example 10 | none | 140 | 99.5 |
| Example 11 | none | 148 | 99.8 |
| Example 12 | none | 140 | 97.0 |
| Example 13 | none | 160 | 99.5 |
| Example 14 | none | 148 | 99.4 |
| Comparative Example 1 | present somewhat | 153 | 50 or less |
| Comparative Example 2 | none | 131 | 50 or less |

What is claimed is:

1. A Method of making a positive electrode comprising the steps of:
   combining a positive electrode-active material, a binder material that is a water dispersable elastomer, a viscosity modifier that is a water soluble polymer, an aqueous dispersion medium, and a dispersing agent to obtain an electrode paste;
   coating the electrode paste on a collector;
   and evaporating the dispersion medium component to obtain the positive electrode; wherein
   the electrode active material is represented by general formula I $$Li_xMPO_4 \qquad (I),$$

in which M is a metal atom of one or more metals selected from the group consisting of Mn, Fe, Co, Ti, Al, and Mo, and 0<x<2; and further wherein
   the dispersing agent is one or more materials selected from the group consisting of nonionic poly(oxyethylene)-styrenated phenyl ether type surfactants, poly(vinylpyrrolidone), and sodium carboxylate salts.

2. The method of claim 1 wherein the aqueous dispersion medium comprises water.

3. The method of claim 1 wherein the aqueous dispersion medium consists essentially of a combination of 99% to 80% by weight water and 20% or less of a water-miscible organic dispersion medium selected from the group consisting of methanol, ethanol, 2-propanol, acetonitrile, and N-methyl-2-pyrrolidone.

4. The method of any of claims 1 to 3 wherein the positive electrode-active material is $LiFePO_4$.

5. The method of claim 4 further comprising including an electroconductive carbon black in the combining of the positive electrode-active material, binder, aqueous dispersion medium, viscosity modifier, and dispersing agent.

* * * * *